United States Patent
Wang et al.

(10) Patent No.: US 12,294,915 B2
(45) Date of Patent: May 6, 2025

(54) SERVICE DATA TRANSMISSION METHOD AND APPARATUS, AND TERMINAL DEVICE

(71) Applicant: GUANGDONG OPPO MOBILE TELECOMMUNICATIONS CORP., LTD., Dongguan (CN)

(72) Inventors: Shukun Wang, Dongguan (CN); Ning Yang, Dongguan (CN); Jianhua Liu, Dongguan (CN)

(73) Assignee: GUANGDONG OPPO MOBILE TELECOMMUNICATIONS CORP., LTD. (CN)

( * ) Notice: Subject to any disclaimer, the term of this patent is extended or adjusted under 35 U.S.C. 154(b) by 623 days.

(21) Appl. No.: 17/693,549

(22) Filed: Mar. 14, 2022

(65) Prior Publication Data
US 2022/0210614 A1 Jun. 30, 2022

Related U.S. Application Data

(63) Continuation of application No. PCT/CN2019/106510, filed on Sep. 18, 2019.

(51) Int. Cl.
*H04W 4/06* (2009.01)
(52) U.S. Cl.
CPC ................... *H04W 4/06* (2013.01)
(58) Field of Classification Search
CPC ... H04W 4/06; H04W 36/08; H04W 36/0007; H04W 4/50
See application file for complete search history.

(56) References Cited

U.S. PATENT DOCUMENTS

| | | | |
|---|---|---|---|
| 2014/0192702 A1 | 7/2014 | Chang | |
| 2014/0355507 A1* | 12/2014 | Amerga | H04W 4/08 370/312 |
| 2016/0344489 A1* | 11/2016 | Kim | H04H 20/12 |
| 2016/0374050 A1* | 12/2016 | Prasad | H04W 36/0007 |
| 2017/0272968 A1* | 9/2017 | Kim | H04W 24/10 |
| 2017/0310718 A1* | 10/2017 | Kim | H04W 36/0058 |
| 2018/0139665 A1* | 5/2018 | Park | H04W 36/0061 |

FOREIGN PATENT DOCUMENTS

| | | |
|---|---|---|
| CN | 102143434 A | 8/2011 |
| CN | 102170610 A | 8/2011 |

OTHER PUBLICATIONS

International Search Report and the Written Opinion Dated May 27, 2020 From the International Searching Authority Re. Application No. PCT/CN2019/106510.
Samsung Corrections for MBMS reception in Receive Only Mode (ROM) R2-1902452 Mar. 1, 2019. the whole document.

* cited by examiner

*Primary Examiner* — Julio R Perez
(74) *Attorney, Agent, or Firm* — Quarles & Brady LLP

(57) ABSTRACT

A service data transmission method includes a terminal device receiving multimedia broadcast multicast service (MBMS) service data of a first cell and MBMS service data of a second cell before a cell change; and the terminal device stopping receiving the MBMS service data of the first cell after the cell change, wherein the first cell is a cell before the cell change, and the second cell is a cell after the cell change.

17 Claims, 12 Drawing Sheets

The terminal device receives the first MBMS service data and the second MBMS service data of the first cell, the second MBMS service data is the same as the first MBMS service data, and a transmission start time of the second MBMS service data is later than a transmission start time of the first MBMS service data ⟋ 601

FIG. 6

SERVICE DATA TRANSMISSION METHOD AND APPARATUS, AND TERMINAL DEVICE

CROSS REFERENCE

This application is a continuation of an International Application No. PCT/CN2019/106510, entitled "SERVICE DATA TRANSMISSION METHOD AND APPARATUS, AND TERMINAL DEVICE", filed on Sep. 18, 2019, which is incorporated by reference in the present application in its entirety.

TECHNICAL FIELD

The embodiments of the present application relate to the field of communication technology, and more particularly, to a service data transmission method and apparatus, and a terminal device.

BACKGROUND

Multimedia broadcast multicast service (MBMS) is a technology that transmits data from one data source to multiple users by sharing network resources. This technology can effectively utilize network resources while providing multimedia services and realize broadcast and multicast of multimedia services at higher rates (e.g., 256 kbps).

In a new radio (NR) system, many scenarios need to support service requirements of multicast and broadcast, such as internet of vehicles, industrial internet, and so on. Therefore, it is necessary to introduce MBMS in NR. For MBMS service in NR, before and after a cell change, a terminal device is located at an edge of a cell, and a signal quality at the edge of the cell is very poor, which will lead to an issue of failure to receive the MBMS service. On the other hand, before and after the cell change, data of MBMS services of two cells are not aligned. In addition, before and after the cell change, the MBMS service data is lost due to an update of an MBMS configuration information.

SUMMARY

Embodiments of the present application provide a service data transmission method and apparatus, and a terminal device.

Embodiments of the present application provide a service data transmission method, comprising:

a terminal device receiving a multimedia broadcast multicast service (MBMS) service data of a first cell and an MBMS service data of a second cell before a cell change; and the terminal device stopping receiving the MBMS service data of the first cell after the cell change;

wherein the first cell is a cell before the cell change, and the second cell is a cell after the cell change.

Embodiments of the present application provide a service data transmission method, comprising:

a terminal device receiving a first MBMS service data and a second MBMS service data of a first cell, wherein the second MBMS service data is same as the first MBMS service data, and a transmission start time of the second MBMS service data is later than a transmission start time of the first MBMS service data.

Embodiments of the present application provide a service data transmission apparatus, comprising:

a receiver configured to receive a multimedia broadcast multicast service (MBMS) service data of a first cell and an MBMS service data of a second cell before a cell change; and the receiver configured to stop receiving the MBMS service data of the first cell after the cell change;

wherein the first cell is a cell before the cell change, and the second cell is a cell after the cell change.

Embodiments of the present application provide a service data transmission apparatus, comprising:

a receiver configured to receive a first MBMS service data and a second MBMS service data of a first cell, wherein the second MBMS service data is same as the first MBMS service data, and a transmission start time of the second MBMS service data is later than a transmission start time of the first MBMS service data.

Embodiments of the present application provide a terminal device comprising a processor and a memory. The memory is used to store a computer program, and the processor is configured to call and run the computer program stored in the memory to perform the above-mentioned service data transmission method.

Embodiments of the present application provide a chip used to perform the above service data transmission method. In details, the chip comprises a processor for calling and running a computer program from a memory, so that a device installed with the chip performs the above service data transmission method.

Embodiments of the present application provide a computer-readable storage medium used for storing a computer program, the computer program causes a computer to perform the above service data transmission method.

Embodiments of the present application provide a computer program product comprising a computer program instruction, the computer program instruction causes a computer to perform the above service data transmission method.

Embodiments of the present application provide a computer program, when the computer program runs on a computer, causes the computer to perform the above service data transmission method.

Through the above technical solutions, broadcast and multicast of MBMS services are supported in an NR system. In addition, a solution is proposed, that is, before the cell change, the terminal device simultaneously receives the MBMS service data of the cell before the cell change (i.e., the first cell) and the MBMS service data of the cell after the cell change (i.e., the second cell). This ensures reliability of MBMS service data transmission. On the other hand, a solution is proposed, that is, a cell sends two MBMS service data at the same time, one MBMS service data is used as a primary service data, and another MBMS service data is used as a secondary service data, so that the reliability of data transmission can also be guaranteed.

BRIEF DESCRIPTION OF THE DRAWINGS

The accompanying drawings described herein are provided to provide a further understanding of the present application and constitute a part of the present application. The exemplary embodiments and descriptions of the present application are used to explain the present application, and do not constitute an improper limitation of the present application. In the accompanying drawings:

FIG. 6 is a schematic flowchart 2 of a service data transmission method provided by an embodiment of the present application.

FIG. 7-1 is a schematic diagram 1 of a primary service data and a secondary service data provided by an embodiment of the present application.

FIG. 7-2 is a schematic diagram 2 of a primary service data and a secondary service data provided by an embodiment of the present application.

DETAILED DESCRIPTION OF ILLUSTRATED EMBODIMENTS

The technical solutions in the embodiments of the present application will be described below with reference to the accompanying drawings in the embodiments of the present application. Obviously, the described embodiments are some, but not all, embodiments of the present application. Based on the embodiments in the present application, all other embodiments obtained by those of ordinary skill in the art without creative efforts shall fall within a protection scope of the present application.

The technical solutions of embodiments of the present application may be applied to various communications systems, for example, a long term evolution (LTE) system, an LTE frequency division duplex (FDD) system, an LTE time division duplex (TDD) system, a 5th generation (5G) communication system or future communication system, etc.

Figure 1:
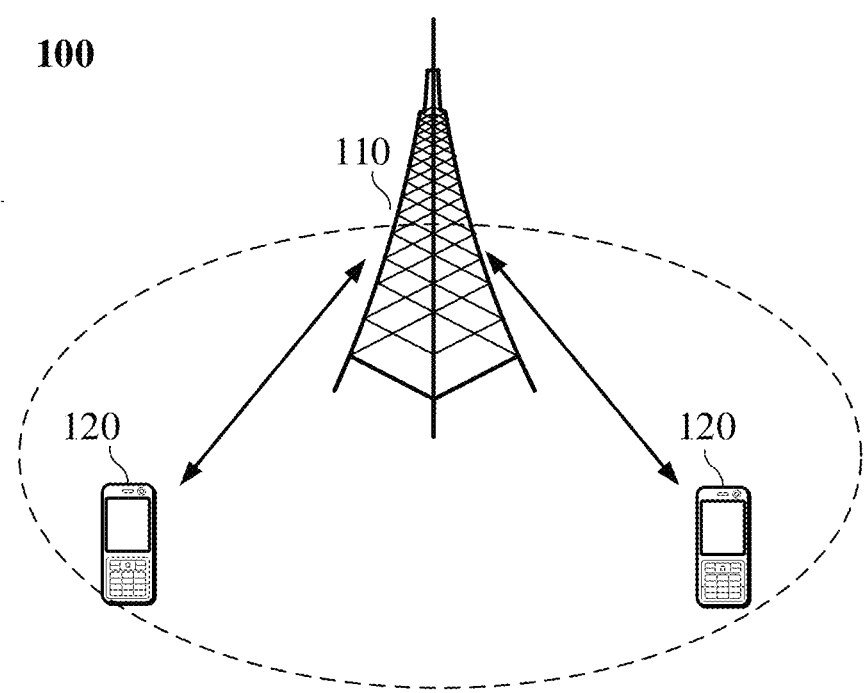
FIG. 1 is a schematic diagram of a communication system architecture provided by an embodiment of the present application.

Exemplarily, a communication system 100 to which embodiments of the present application are applied is as illustrated in FIG. 1. The communication system 100 may include a network device 110. The network device 110 may be a device communicating with a terminal 120 (or called a communication terminal or a terminal). The network device 110 can provide a communication coverage for a specific geographical area and communicate with terminal devices in the coverage area. The network device 110 may be an evolutional Node B (eNB or eNodeB) in the LTE system or may be a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future communication system.

The communication system 100 further includes at least one terminal device 120 located in the coverage area of the network device 110. The "terminal device" referred to herein can include but is not limited to a device configured to communicate via a wired line, another data connection/network, and/or a wireless interface, a device which is part of another terminal device and configured to receive/transmit communication signals, or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", and/or a "mobile terminal". Examples of a mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browser, notebook, calendar, and/or global positioning system (GPS) receiver, and/or a conventional laptop, a handheld receiver, or other electronic devices equipped with a radio telephone transceiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in a future evolved public land mobile network (PLMN), etc.

Optionally, terminal devices 120 can communicate with each other through device to device (D2D) communication.

Optionally, the 5G system or 5G network can also be referred to as an NR system or NR network.

FIG. 1 exemplarily illustrates one network device and two terminal devices. The communication system 100 may also include multiple network devices, and there can be other numbers of terminal devices in a coverage area of each of the network devices, and the embodiment of the present application is not limited in this regard.

Optionally, the communication system 100 may further include other network entities such as a network controller, a mobile management entity, or the like, and the embodiment of the present application is not limited in this regard.

It should be understood that, according to embodiments of the present, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, and the embodiment of the present application is not limited in this regard.

It should be understood that the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

In order for better understanding of the technical solutions of embodiments of the present application, the following will describe in detail technical solutions related to the embodiments of the present application herein.

With people's pursuit of speed, low latency, high-speed mobility and energy efficiency, and diversity and complexity of services in future life, the 3rd generation partnership project (3GPP) international standard organization began developing 5G, and 5G is mainly applied to enhanced mobile broadband (eMBB), ultra-reliable low-latency communications (URLLC), and massive machine-type communications (mMTC).

On one hand, eMBB is still aimed at obtaining multimedia content, services, and data for users and grows rapidly in demand. On the other hand, because eMBB may be deployed in different scenarios, such as indoor, urban, rural areas, etc., its capabilities and requirements vary widely and cannot be generalized. Therefore, analysis of eMBB should depend on specific deployment scenarios. Typical applications of URLLC include industrial automation, power automation, telemedicine operations, and traffic safety assurance. mMTC is typically characterized by high connection density, small amount of data, delay-insensitive services, low cost of modules, and long service life.

RRC State:

In order to reduce air interface signaling, restore wireless connection quickly, and restore data services quickly, a new radio resource control (RRC) state, i.e., RRC_INACTIVE state, is defined for 5G. This state is different from an RRC_IDLE state and an RRC_ACTIVE state.

1) In the RRC_IDLE state (referred to as an idle state for short): mobility is UE-based cell selection and reselection, paging is initiated by a core network (CN), and a paging area is configured by the CN. There is neither UE context nor RRC connection at the base station side.

2) In an RRC_CONNECTED state (referred to as a connected state for short): an RRC connection exists, and UE contexts exist at the base station side and the UE side. The network side knows that the position of the UE is at a specific cell level. Mobility is controlled by the network side. Unicast data may be transmitted between the UE and the base station.

3) In the RRC_INACTIVE state (referred to as an inactive state for short): mobility is UE-based cell selection and reselection, there is a connection between a CN and an NR, there is a UE context on a certain base station, paging is triggered by a radio access network (RAN), a RAN-based paging area is managed by the RAN, and the network side knows that the position of the UE is at a RAN-based paging area level.

MBMS:

MBMS is introduced in 3GPP release 6 (R6). MBMS is a technology that transmits data from one data source to multiple UEs by sharing network resources. This technology can effectively utilize network resources while providing multimedia services and realize broadcast and multicast of multimedia services at higher rates (e.g., 256 kbps).

Due to a low spectral efficiency of MBMS in 3GPP R6, it is not enough to effectively carry and support an operation of mobile TV type services. Therefore, in LTE, 3GPP clearly proposes to enhance a support capability for downlink high-speed MBMS services and determines design requirements for physical layer and air interface.

3GPP R9 introduced evolved MBMS (eMBMS) into LTE. eMBMS proposes a concept of single frequency network (SFN), namely multimedia broadcast multicast service single frequency network (MBSFN). MBSFN uses a uniform frequency to transmit service data in all cells at the same time, but the synchronization between cells should be guaranteed. In this way, an overall signal-to-noise ratio distribution of the cell can be greatly improved, and a spectral efficiency will also be greatly improved accordingly. eMBMS implements service broadcast and multicast based on IP multicast protocol.

In LTE or LTE-Advanced (LTE-A), MBMS has only a broadcast bearer mode and no multicast bearer mode. In addition, the reception of MBMS services is applicable to UEs in idle state or connected state.

In 3GPP R13, a concept of single cell point to multipoint (SC-PTM) is introduced, and the SC-PTM is based on the MBMS network architecture.

MBMS introduces new logical channels, including single cell-multicast control channel (SC-MCCH) and single cell-multicast transport channel (SC-MTCH). SC-MCCH and SC-MTCH are mapped to downlink-shared channel (DL-SCH). Further, the DL-SCH is mapped to a physical downlink shared channel (PDSCH). SC-MCCH and SC-MTCH belong to logical channels, DL-SCH belongs to transport channels, and PDSCH belongs to physical channels. SC-MCCH and SC-MTCH do not support a hybrid automatic repeat request (HARM) operation.

MBMS introduces a new system information block (SIB) type, namely SIB20. Specifically, a configuration information of the SC-MCCH is transmitted through SIB20, and a cell has only one SC-MCCH. The configuration information of the SC-MCCH includes a modification period of the SC-MCCH, a repetition period of the SC-MCCH, and information such as a radio frame and a subframe in which the SC-MCCH is scheduled. Further, 1) the boundary of the modification period of SC-MCCH satisfies SFN mod m=0, where SFN represents a system frame number of the boundary, and m is the modification period of SC-MCCH configured in SIB20 (i.e., sc-mcch-ModificationPeriod). 2) The radio frame for scheduling SC-MCCH satisfies: SFN mod mcch-RepetitionPeriod=mcch-Offset, where SFN represents the system frame number of the radio frame, mcch-RepetitionPeriod represents the repetition period of SC-MCCH, and mcch-Offset represents SC-MCCH offset. 3) The subframe in which the SC-MCCH is scheduled is indicated by sc-mcch-Subframe.

The SC-MCCH is scheduled through a physical downlink control channel (PDCCH). On the one hand, a new radio network temporary identity (RNTI), that is, a single cell RNTI (SC-RNTI) is introduced to identify the PDCCH (such as SC-MCCH PDCCH) used for scheduling the SC-MCCH. Optionally, a fixed value of SC-RNTI is FFFC. On the other hand, a new RNTI, i.e., single cell notification RNTI (SC-N-RNTI), is introduced to identify the PDCCH (e.g., notification PDCCH) used to indicate a change notification of the SC-MCCH. Optionally, a fixed value of SC-N-RNTI is FFFB. Further, the change notification may be indicated by one bit of 8 bits of DCI 1C. In LTE, the configuration information of the SC-PTM is based on the SC-MCCH configured by the SIB20, and then the SC-MCCH configures the SC-MTCH, and the SC-MTCH is used to transmit service data.

Specifically, the SC-MCCH only transmits one message (i.e., SCPTMConfiguration). This message is used to configure the configuration information of SC-PTM. The configuration information of SC-PTM includes a temporary mobile group identity (TMGI), a session identifier (session ID), a group RNTI (G-RNTI), a discontinuous reception (DRX) configuration information, and SC-PTM service information of neighboring cells, etc. It should be noted that the SC-PTM in R13 does not support a robust header compression (ROHC) function.

Downlink discontinuous reception of SC-PTM is controlled by the following parameters: onDurationTimerSCPTM, drx-InactivityTimerSCPTM, SC-MTCH-SchedulingCycle, and SC-MTCH-SchedulingOffset.

When [(SFN*10)+subframe number] modulo (SC-MTCH-SchedulingCycle)=SC-MTCH-SchedulingOffset is satisfied, a timer onDurationTimerSCPTM is started.

When a downlink PDCCH scheduling is received, a timer drx-InactivityTimerSCPTM is started.

The downlink SC-PTM service is received only when the timer onDurationTimerSCPTM or drx-InactivityTimerSCPTM is running.

SC-PTM business continuity adopts a concept of MBMS business continuity based on SIB15, namely "SIB15+MBMSInterestIndication". A service continuity of a UE in in idle state is based on a concept of frequency priority.

In NR, many scenarios need to support business requirements of multicast and broadcast, such as internet of vehicles, industrial internet, etc. Therefore, it is necessary to introduce MBMS in NR. NR MBMS is transmitted by beam sweeping on the air interface. First, in order to improve a transmission reliability, a repeated transmission mechanism can be introduced. Secondly, a transmission of broadcast service data in beam sweeping mode requires an association between a scheduling signaling (i.e., PDCCH) of the MBMS service and the SSB. This facilitates the UE to correctly acquire MBMS service data. To this end, the following technical solutions of the embodiments of the present application are proposed.

Figure 5:
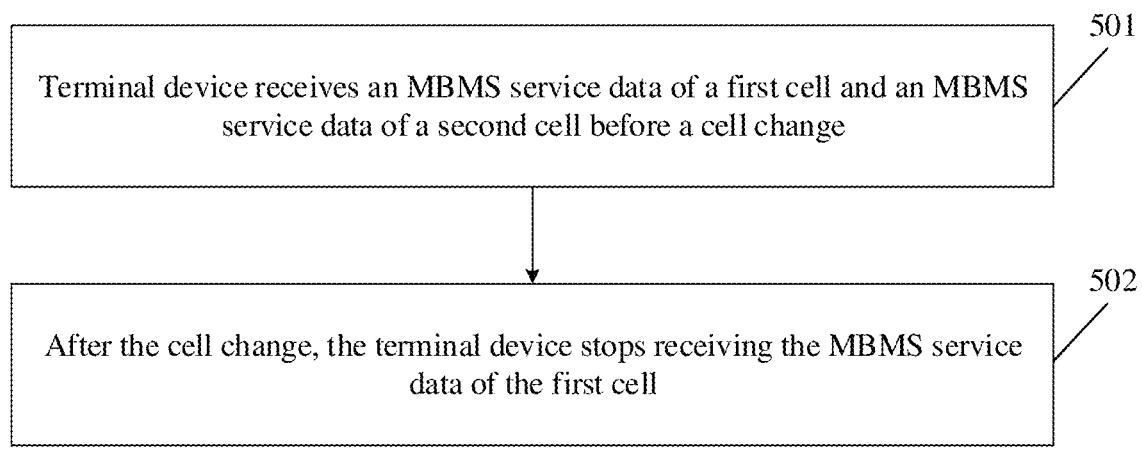
FIG. 5 is a schematic flowchart 1 of a service data transmission method provided by an embodiment of the present application.

In the technical solutions of the embodiments of the present application, a new SIB (called a first SIB) is defined. Referring to FIG. 5, the first SIB includes a configuration information of a first MCCH. Here, the first MCCH is a control channel of an MBMS service. In other words, the first SIB is used to configure a configuration information of a control channel of an NR MBMS. Optionally, the control channel of the NR MBMS may also be called an NR MCCH (i.e., a first MCCH).

Further, the first MCCH is used to carry a first signaling. This embodiment of the present application does not limit the name of the first signaling. For example, the first signaling is signaling A. The first signaling includes configuration information of at least one first MTCH. Here, the first MTCH is a traffic channel (also referred to as a data channel or a transport channel) of the MBMS service. The first MTCH is used to transmit MBMS service data (such as NR MBMS service data). In other words, the first MCCH is used to configure the configuration information of the traffic channel of the NR MBMS. Optionally, the traffic channel of the NR MBMS may also be called an NR MTCH (i.e., the first MTCH).

In details, the first signaling is used to configure the traffic channel of the NR MBMS, a service information corresponding to a service channel, and a scheduling information corresponding to the service channel. Further, optionally, the service information corresponding to the service channel, such as TMGI, session ID, and other service identification information. The scheduling information corresponding to the traffic channel, for example, an RNTI used when the MBMS service data corresponding to the traffic channel is scheduled, such as G-RNTI, DRX configuration information, and the like.

It should be noted that transmissions of the first MCCH and the first MTCH are both scheduled based on the PDCCH. The RNTI used by the PDCCH for scheduling the first MCCH uses a unique identifier of the entire network, that is, a fixed value. The RNTI used by the PDCCH for scheduling the first MTCH is configured through the first MCCH.

Figure 3:
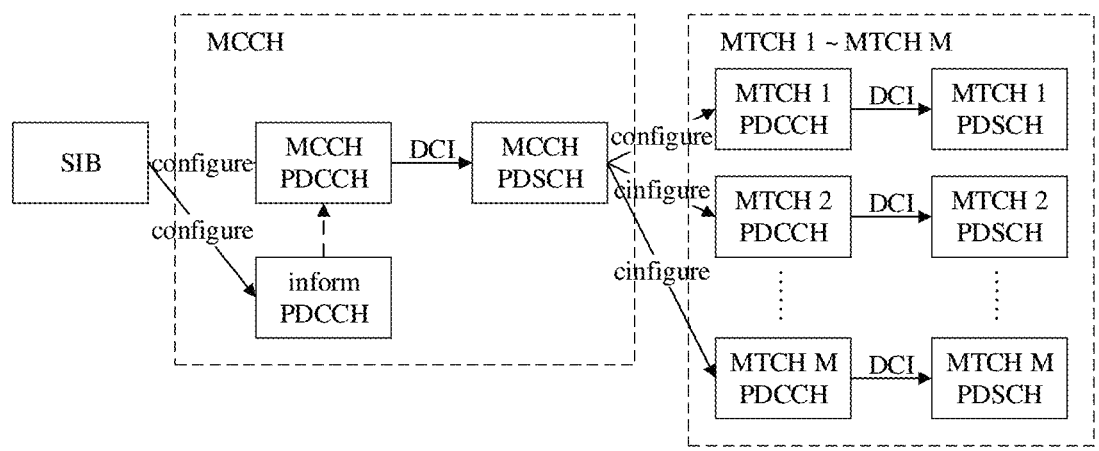
FIG. 3 is a schematic diagram of a PTM configuration transmission mechanism provided by an embodiment of the present application.
Figure 4:
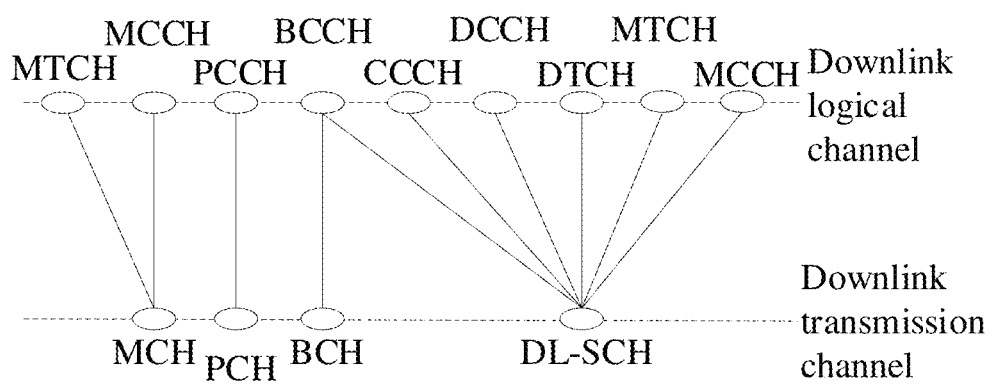
FIG. 4 is a PTM channel and a mapping diagram thereof provided by an embodiment of the present application.

It should be noted that, this embodiment of the present application does not limit the naming of the first SIB, the first MCCH, and the first MTCH. For convenience of description, the first SIB may also be abbreviated as SIB, the first MCCH may also be abbreviated as MCCH, and the first MTCH may also be abbreviated as MTCH. Referring to FIG. 3, the PDCCH (i.e., the MCCH PDCCH) used for scheduling the MCCH and the notification PDCCH are configured through the SIB. The PDSCH (i.e., MCCH PDSCH) used to transmit the MCCH is scheduled through a DCI carried by the MCCH PDCCH. Further, M PDCCHs for scheduling the MTCH (i.e., MTCH 1 PDCCH, MTCH 2 PDCCH, . . . , MTCH M PDCCH) are configured through the MCCH. The DCI scheduling carried by the MTCH n PDCCH is used to transmit the PDSCH of the MTCH n (i.e., the MTCH n PDSCH), where n is an integer greater than or equal to 1 and less than or equal to M. Referring to FIG. 4, MCCH and MTCH are mapped on DL-SCH. Further, the DL-SCH is mapped to the PDSCH. MCCH and MTCH belong to logical channels, DL-SCH belongs to transport channels, and PDSCH belongs to physical channels.

FIG. 5 is a schematic flowchart 1 of a service data transmission method provided by an embodiment of the present application. As illustrated in FIG. 5, the service data transmission method includes the following steps:

Step 501: Terminal device receives an MBMS service data of a first cell and an MBMS service data of a second cell before a cell change.

In an embodiment of the present application, the first cell is a cell before the cell change, and the second cell is a cell after the cell change. Further, optionally, the cell change refers to a cell reselection or a cell handover.

In an embodiment of the present application, the terminal device has strong communication capability, for example, the terminal device can support multiple frequency bands and/or band combinations, for example, the terminal device has a capability of supporting multiple radio frequency channels. Based on this, the terminal device has a capability of simultaneously receiving the MBMS service data of two cells at the cell edge.

In an embodiment of the present application, the terminal device is located at the edge of a cell (e.g., at a junction between the first cell and the second cell), before the cell change, the terminal device simultaneously receives an MBMS service data of a neighboring cell (i.e., the second cell) on the premise of receiving the MBMS service data of the current cell (i.e., the first cell).

In an embodiment of the present application, in order to be able to receive the MBMS service data of the second cell, the terminal device needs to acquire an MBMS configuration information of the second cell before the cell change. The MBMS configuration information of the second cell is used by the terminal device to receive the MBMS service data of the second cell.

Further, in an optional implementation manner, the terminal device may acquire the MBMS configuration information of the second cell in any of the following manners:

Manner 1: Before the cell change, the terminal device acquires the MBMS configuration information of the second cell from the first cell.

In one example, the first cell broadcasts a first SIB. The first SIB includes not only configuration information of a first MCCH of the first cell, but also a configuration information of a second MCCH of the second cell. The terminal device receives the second MCCH based on the configuration information of the second MCCH and obtains the configuration information of the second MTCH based on the second MCCH. Then, the terminal device receives the second MTCH based on the configuration information of the second MTCH, where the second MTCH is used to transmit the MBMS service data on the second cell side.

In another example, the first cell broadcasts the first SIB. The first SIB includes not only the configuration information of the first MCCH of the first cell, but also the configuration information of the second MTCH of the second cell. The terminal device receives the second MTCH based on the configuration information of the second MTCH, where the second MTCH is used to transmit the MBMS service data on the second cell side.

It should be noted that, the second MCCH and the second MTCH here can be understood with reference to the description of the first MCCH and the first MTCH. "First" and "second" are used to distinguish two different cells, and their concepts are similar.

Manner 2: Before the cell change, the terminal device acquires the MBMS configuration information of the second cell from a neighboring cell of the first cell.

In an example, the neighbor of the first cell is the second cell, and the second cell broadcasts the second SIB. The second SIB includes a configuration information of the second MCCH of the second cell. The terminal device receives the second MCCH based on the configuration information of the second MCCH and obtains the configuration information of the second MTCH based on the second MCCH. Then, the terminal device receives the second MTCH based on the configuration information of the second MTCH, where the second MTCH is used to transmit the MBMS service data on the second cell side.

It should be noted that, the second MCCH and the second MTCH here can be understood with reference to the description of the first MCCH and the first MTCH. "First" and "second" are used to distinguish two different cells, and their concepts are similar.

Step 502: After the cell change, the terminal device stops receiving the MBMS service data of the first cell.

In an embodiment of the present application, the terminal device stops receiving the MBMS service data of the first cell after the cell change. Optionally, the terminal device continues to receive the MBMS service data of the second cell.

In an embodiment of the present application, the MBMS service data of the first cell and the MBMS service data of the second cell have the same TMGI and/or session identifier. That is to say, the MBMS service data of the first cell and the MBMS service data of the second cell are the same in content.

In an embodiment of the present application, after the cell change, the terminal device completely moves within a coverage of the second cell, and at this time, the terminal device can stop receiving the MBMS service data of the first cell. Optionally, the terminal device continues to receive the MBMS service data of the second cell.

FIG. 6 is a schematic flowchart 2 of a service data transmission method provided by an embodiment of the present application. As illustrated in FIG. 6, the service data transmission method includes the following steps:

Step 601: The terminal device receives the first MBMS service data and the second MBMS service data of the first cell, the second MBMS service data is the same as the first MBMS service data, and a transmission start time of the second MBMS service data is later than a transmission start time of the first MBMS service data.

Figures 1, 7:
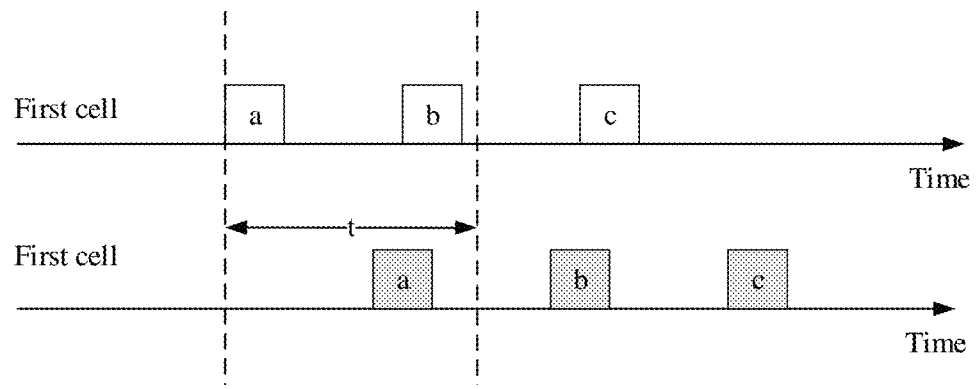
Figures 2, 7:
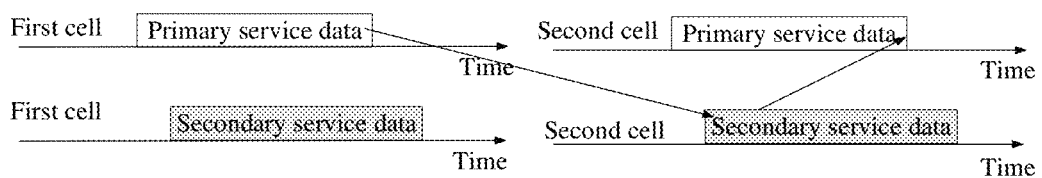

In an embodiment of the present application, one cell transmits two identical MBMS service data at the same time. The two MBMS service data have the same MBMS configuration information, and the difference is that the two MBMS service data have a certain time interval in space transmission. As illustrated in FIG. 7-1, the first cell simultaneously transmits two identical MBMS service data, that is, the first MBMS service data and the second MBMS service data. The transmission start time of the second MBMS service data is later than the transmission start time of the first MBMS service data, and a time interval between them is t. Further, the first MBMS service data is a primary service data of the first cell, and the second MBMS service data is a secondary service data of the first cell.

In an embodiment of the present application, the terminal device preferentially receives and processes the first MBMS service data. In the case that the terminal device detects that the first MBMS service data fails to be received, the terminal device receives and processes the second MBMS service data. The "receiving and processing" here refers to the related processing such as decoding, detecting whether the packet is lost, and presenting the service data.

In an optional implementation manner, detecting that the first MBMS service data fails to receive includes: detecting that there is a packet loss in the first MBMS service data; or failing to decode the first MBMS service data.

In details, the terminal device is in the first cell and simultaneously receives the primary service data and the secondary service data. The transmission start time of the primary service data is earlier than the transmission start time of the secondary service data, and the primary service data is preferentially received and processed. If it is found that a data packet in the primary service data is lost or fails to be decoded, the lost data packet or the data packet that fails to be decoded can be retrieved from the secondary service data. Thus, reliability of service data transmission is satisfied.

In an optional implementation manner, the terminal device changes from the first cell to the second cell and receives a third MBMS service data and a fourth MBMS service data of the second cell. The fourth MBMS service data is the same as the third MBMS service data, and a transmission start time of the fourth MBMS service data is later than a transmission start time of the third MBMS service data.

Here, in the same way as the first cell, the second cell also sends two identical MBMS service data, that is, the third MBMS service data and the fourth MBMS service data. The third MBMS service data is a primary service data of the second cell, and the fourth MBMS service data is a secondary service data of the second cell.

It should be noted that the cell change in an embodiment of the present application refers to a cell reselection or a cell handover.

Further, in the process of changing from the first cell to the second cell, the terminal device receives and processes the fourth MBMS service data. After the terminal device is changed from the first cell to the second cell, the terminal device receives and processes the third MBMS service data.

Figure 2:
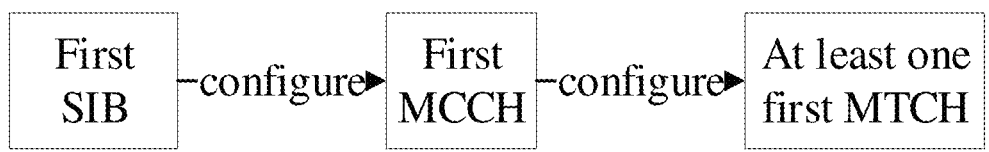
FIG. 2 is a schematic diagram of a first SIB related configuration provided by an embodiment of the present application.

Referring to FIG. 7-2, in the process of changing the terminal device from the first cell to the second cell, the terminal device preferentially receives and processes the secondary service data of the second cell. In this way, issues such as service interruption or service delay caused by a cell change delay can be compensated. After the terminal device changes from the first cell to the second cell, the terminal device preferentially receives and processes the primary service data of the second cell. In this way, it can be ensured that if the terminal device finds that a certain data packet in the primary service data is lost or fails to be decoded. Then, the lost data packet or the data packet that fails to be decoded can be retrieved from the secondary service data, so as to meet reliability of service data transmission. On the other hand, issues such as service interruption or service delay caused by the cell change can still be compensated for in the next cell change.

It should be noted that no matter which cell the terminal device accesses, the terminal device always receives the primary service data and secondary service data sent by the cell. In addition, the prerequisite for the terminal device to receive the primary service data and the secondary service data is to acquire the MBMS configuration information of the cell. The acquisition of the corresponding MBMS configuration information can be understood with reference to the description of the foregoing solution.

Figure 8:
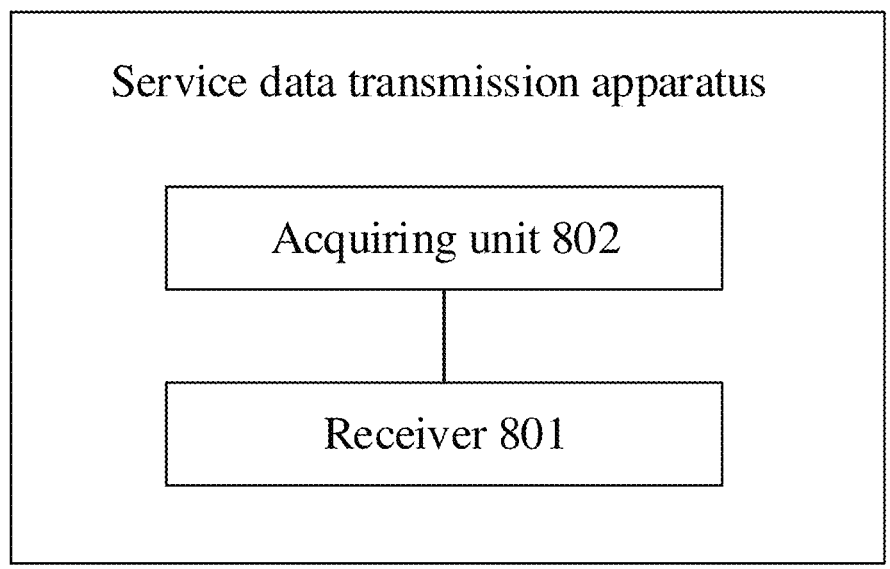
FIG. 8 is a schematic structural diagram 1 of a service data transmission apparatus provided by an embodiment of the present application.

FIG. 8 is a schematic structural diagram 1 of a service data transmission apparatus provided by an embodiment of the present application. As illustrated in FIG. 8, the service data transmission device includes:

a receiver 801 configured to receive an MBMS service data of a first cell and an MBMS service data of a second cell before a cell change; and the receiver 801 configured to stop receiving the MBMS service data of the first cell after the cell change;

wherein the first cell is a cell before the cell change, and the second cell is a cell after the cell change.

In an alternative embodiment, the apparatus further comprises:

an acquiring unit 802 configured to acquire an MBMS configuration information of the second cell before the cell change, wherein the MBMS configuration information of the second cell is used by the terminal device to receive the MBMS service data of the second cell.

In an alternative embodiment, the acquiring unit 802 is configured to acquire the MBMS configuration information of the second cell from the first cell before the cell change; or the acquiring unit 802 is configured to acquire the MBMS configuration information of the second cell from a neighboring cell of the first cell before the cell change.

In an alternative embodiment, the MBMS service data of the first cell and the MBMS service data of the second cell have a same TMGI and/or session identifier.

In an alternative embodiment, the cell change refers to a cell reselection or a cell handover.

It should be understood by those skilled in the art that the relevant description of the above service data transmission apparatus in the embodiment of the present application can be understood with reference to the relevant description of the service data transmission method in the embodiment of the present application.

Figure 9:
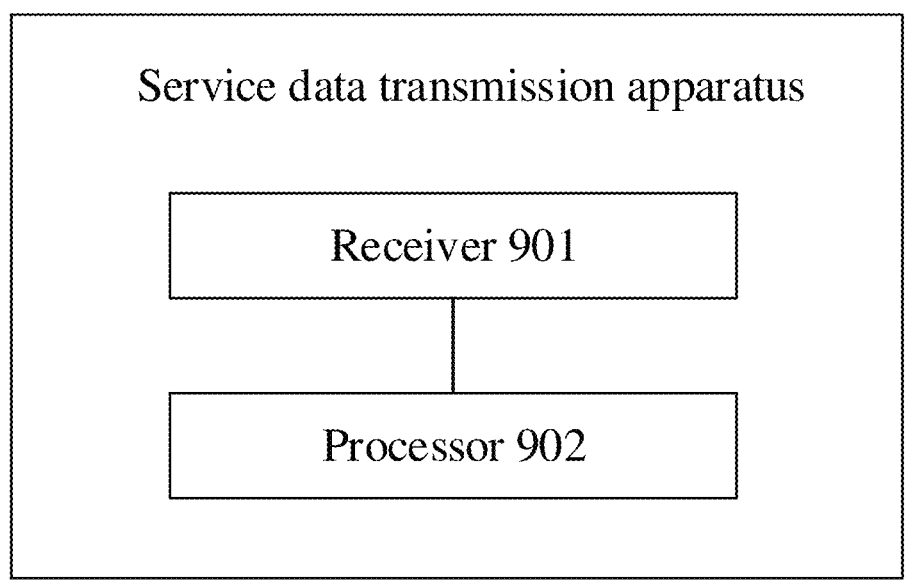
FIG. 9 is a schematic structural diagram 2 of a service data transmission apparatus provided by an embodiment of the present application.

FIG. 9 is a schematic structural diagram 2 of a service data transmission apparatus provided by an embodiment of the present application. As illustrated in FIG. 9, the service data transmission device includes:

a receiver 901 configured to receive a first MBMS service data and a second MBMS service data of a first cell, wherein the second MBMS service data is same as the first MBMS service data, and a transmission start time of the second MBMS service data is later than a transmission start time of the first MBMS service data.

In an alternative embodiment, the apparatus further comprises:

a processor 902 configured to receive and process the first MBMS service data, wherein when the processor detects that the first MBMS service data fails to be received, the processor receives and processes the second MBMS service data.

In an alternative embodiment, detecting that the first MBMS service data fails to be received comprises:

detecting that there is a packet loss in the first MBMS service data; or failing to decode the first MBMS service data.

In an alternative embodiment, the first MBMS service data is a primary service data of the first cell, and the second MBMS service data is a secondary service data of the first cell.

In an alternative embodiment, the receiver 901 is further configured to change from the first cell to the second cell and receive a third MBMS service data and a fourth MBMS service data of the second cell, wherein the fourth MBMS service data is same as the third MBMS service data, and a transmission start time of the fourth MBMS service data is later than a transmission start time of the third MBMS service data.

In an alternative embodiment, the apparatus further comprises:

a processor 902 configured to receive and process the fourth MBMS service data during a process of changing from the first cell to the second cell; the processor 902 configured to receive and process the third MBMS service data after changing from the first cell to the second cell.

In an alternative embodiment, the third MBMS service data is a primary service data of the second cell, and the fourth MBMS service data is a secondary service data of the second cell.

In an alternative embodiment, a cell change refers to a cell reselection or a cell handover.

It should be understood by those skilled in the art that the relevant description of the above service data transmission apparatus in the embodiment of the present application can be understood with reference to the relevant description of the service data transmission method in the embodiment of the present application.

Figure 10:
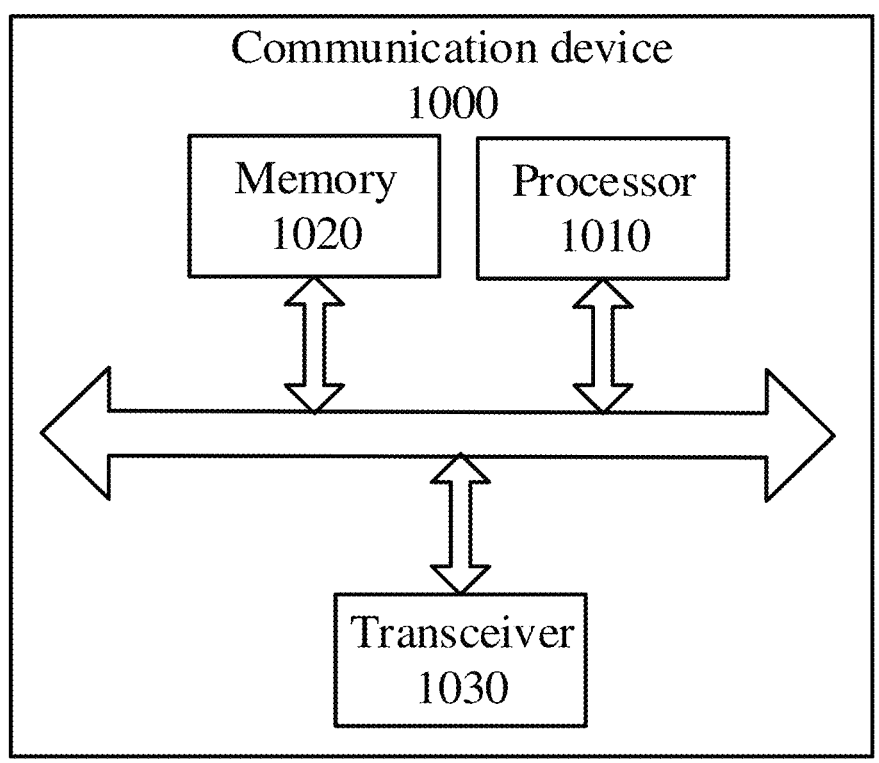
FIG. 10 is a schematic structural diagram of a communication device provided by an embodiment of the present application.

FIG. 10 is a schematic structural diagram of a communication device 1000 provided by an embodiment of the present application. The communication device may be a terminal device or a network device. The communication device 1000 illustrated in FIG. 10 includes a processor 1010, and the processor 1010 may call and run a computer program in a memory to implement the method in the embodiments of the present application.

Optionally, as illustrated in FIG. 10, the communication device 1000 may further include the memory 1020. The processor 1010 may call and run the computer program in the memory 1020 to implement the method in the embodiments of the present application.

The memory 1020 may be an independent device independent of the processor 1010 and may also be integrated into the processor 1010.

Optionally, as illustrated in FIG. 10, the communication device 1000 may further include a transceiver 1030, and the processor 1010 may control the transceiver 1030 to communicate with another device, specifically sending information or data to the other device or receiving information or data from the other device.

The transceiver 1030 may include a transmitter and a receiver. The transceiver 1030 may further include antennae. The number of the antennae may be one or more.

Optionally, the communication device 1000 may specifically be the network device of the embodiments of the present application. The communication device 1000 may implement corresponding flows implemented by the network device in each method of the embodiments of the present application. For simplicity, elaborations are omitted herein.

Optionally, the communication device 1000 may specifically be the mobile terminal/terminal device of the embodiments of the present application. The communication device 1000 may implement the corresponding flows implemented by the mobile terminal/terminal device in each method of the embodiments of the present application. For simplicity, elaborations are omitted herein.

Figure 11:
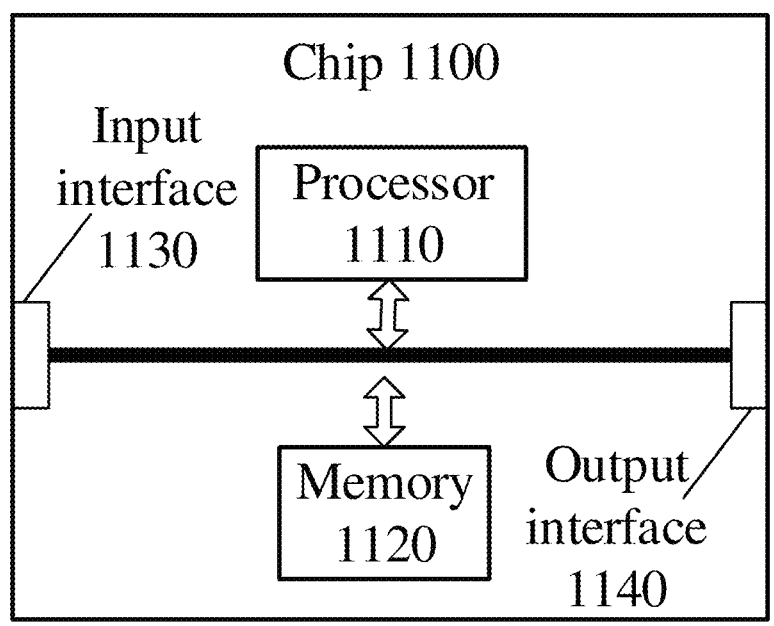
FIG. 11 is a schematic structural diagram of a chip according to an embodiment of the present application.

FIG. 11 is a schematic structural diagram of a chip provided by an embodiment of the present application. The chip 1100 illustrated in FIG. 11 includes a processor 1110. The processor 1110 may call and run a computer program in a memory to implement the method in the embodiments of the present application.

Optionally, as illustrated in FIG. 11, the chip 1100 may further include the memory 1120. The processor 1110 may call and run the computer program in the memory 1120 to implement the method in the embodiments of the present application.

The memory 1120 may be an independent device independent of the processor 1110 and may also be integrated into the processor 1110.

Optionally, the chip 1100 may further include an input interface 1130. The processor 1110 may control the input interface 1130 to communicate with another device or chip, specifically acquiring information or data from the another device or chip.

Optionally, the chip 1100 may further include an output interface 1140. The processor 1110 may control the output interface 1140 to communicate with another device or chip, specifically outputting information or data sent by the another device or chip.

Optionally, the chip may be applied to the network device of the embodiments of the present application. The chip may implement corresponding flows implemented by the network device in each method of the embodiments of the present application. For simplicity, elaborations are omitted herein.

Optionally, the chip may be applied to the mobile terminal/terminal device of the embodiment of the present application. The chip may implement corresponding flows implemented by the mobile terminal/terminal device in each method of the embodiment of the present application. For simplicity, elaborations are omitted herein.

It is to be understood that the chip mentioned in the embodiment of the present application may also be called a system-level chip, a system chip, a chip system, or a system on chip, etc.

Figure 12:
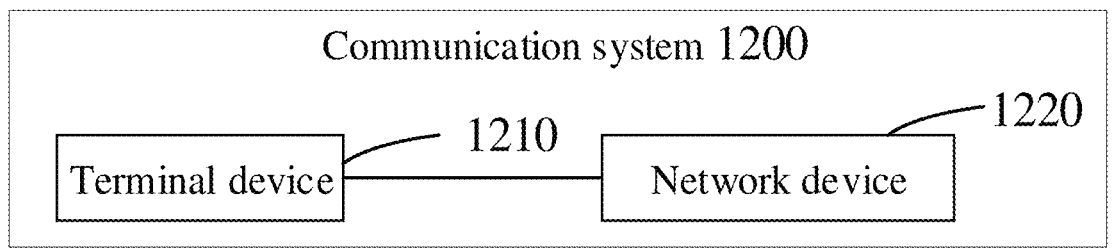
FIG. 12 is a schematic block diagram of a communication system provided by an embodiment of the present application.

FIG. 12 is a schematic block diagram of a communication system 1200 provided by an embodiment of the present application. As illustrated in FIG. 12, a communication system 1200 includes a terminal device 1210 and a network device 1220.

The terminal device 1210 may be configured to realize corresponding functions realized by the terminal device in the method. The network device 1220 may be configured to realize corresponding functions realized by the network device in the method. For simplicity, elaborations are omitted herein.

It is to be understood that the processor in the embodiment of the present application may be an integrated circuit chip and has a signal processing capacity. In an implementation process, each step of the method embodiments may be completed by an integrated logical circuit of hardware in the processor or an instruction in a software form. The processor may be a universal processor, a digital signal processor (DSP), an application specific integrated circuit (ASIC), a field programmable gate array (FPGA) or another programmable logical device, discrete gate or transistor logical device and discrete hardware component. Each method, step and logical block diagram disclosed in the embodiments of the present application may be implemented or executed. The universal processor may be a microprocessor, or the processor may also be any conventional processor and the like. The steps of the method disclosed in combination with the embodiments of the present application may be directly embodied to be executed and completed by a hardware decoding processor or executed and completed by a combination of hardware and software modules in the decoding processor. The software module may be located in a mature storage medium in this field such as a random access memory (RAM), a flash memory, a read-only memory (ROM), a programmable ROM (PROM) or electrically erasable PROM (EEPROM) and a register. The storage medium is located in a memory, and the processor reads information in the memory, and completes the steps of the method in combination with hardware.

It can be understood that the memory in the embodiment of the present application may be a volatile memory or a nonvolatile memory or may include both the volatile and nonvolatile memories. The nonvolatile memory may be a ROM, a PROM, an erasable PROM (EPROM), an EEPROM or a flash memory. The volatile memory may be a RAM and is used as an external high-speed cache. It is exemplarily but unlimitedly describing that RAMs in various forms may be adopted, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM) and a direct rambus RAM (DR RAM). It is to be noted that the memory of a system and method described in the present application is intended to include, but not limited to, memories of these and any other proper types.

It is to be understood that the memory is exemplarily but unlimitedly described. For example, the memory in the embodiments of the present application may also be an SRAM, a DRAM, an SDRAM, a DDR SDRAM, an ESDRAM, an SLDRAM and a DR RAM. That is, the memory in the embodiments of the present application is intended to include, but not limited to, memories of these and any other proper types.

The embodiments of the present application also provide a computer-readable storage medium, which is configured to store a computer program.

Optionally, the computer-readable storage medium may be applied to a network device in the embodiments of the present application. The computer program causes a computer to execute corresponding flows implemented by the network device in each method of the embodiments of the present application. For simplicity, elaborations are omitted herein.

Optionally, the computer-readable storage medium may be applied to a mobile terminal/terminal device in the embodiments of the present application. The computer program causes a computer to execute corresponding flows implemented by the mobile terminal/terminal device in each method of the embodiments of the present application. For simplicity, elaborations are omitted herein.

The embodiments of the present application also provide a computer program product, which includes a computer program instruction.

Optionally, the computer program product may be applied to a network device in the embodiments of the present application. The computer program instruction causes a computer to execute corresponding flows implemented by the network device in each method of the embodiments of the present application. For simplicity, elaborations are omitted herein.

Optionally, the computer program product may be applied to a mobile terminal/terminal device in the embodiments of the present application. The computer program instruction causes the computer to execute corresponding flows implemented by the mobile terminal/terminal device in each method of the embodiments of the present application. For simplicity, elaborations are omitted herein.

The embodiments of the present application also provide a computer program.

Optionally, the computer program may be applied to a network device in the embodiments of the present application. The computer program runs in a computer to cause the computer to execute corresponding flows implemented by the network device in each method of the embodiments of the present application. For simplicity, elaborations are omitted herein.

Optionally, the computer program may be applied to a mobile terminal/terminal device in the embodiments of the present application. The computer program runs in the computer to cause the computer to execute corresponding flows implemented by the mobile terminal/terminal device in each method of the embodiments of the present application. For simplicity, elaborations are omitted herein.

Those of ordinary skill in the art may realize that the units and algorithm steps of each example described in combination with the embodiments disclosed in the present application may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the present application.

Those skilled in the art may clearly learn about that specific working processes of the system, device and unit described above may refer to the corresponding processes in the method embodiment and will not be elaborated herein for convenient and brief description.

In some embodiments provided by the present application, it is to be understood that the disclosed system, device, and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated. Parts displayed as units may or may not be physical units, and namely may be located in the same place, or may also be distributed to multiple network units. Part or all of the units may be selected to achieve the solutions of the embodiments according to a practical requirement.

In addition, each functional unit in each embodiment of the present application may be integrated into a processing unit. Each unit may also physically exist independently. Two or more than two units may also be integrated into a unit.

When being realized in form of software functional unit and sold or used as an independent product, the function may also be stored in a computer-readable storage medium. For such an understanding, the technical solutions of the present application substantially or parts making contributions to the conventional art or part of the technical solutions may be embodied in form of software product. The computer software product may be stored in a storage medium, including a plurality of instructions configured to cause a computer device (which may be a personal computer, a server, a network device, or the like) to execute all or part of the steps of the method in each embodiment of the present application. The abovementioned storage medium includes various media capable of storing program codes such as a U disk, a mobile hard disk, a ROM, a RAM, a magnetic disk or an optical disk.

The above is only the specific implementation mode of the present application and not intended to limit the scope of protection of the present application. Any variations or replacements apparent to those skilled in the art within the technical scope disclosed by the present application shall fall within the scope of protection of the present application. Therefore, the scope of protection of the present application shall be subject to the scope of protection of the claims.

What is claimed is:

1. A service data transmission method, comprising:
a terminal device receiving a multimedia broadcast multicast service (MBMS) service data of a first cell and an MBMS service data of a second cell before a cell change; and
the terminal device stopping receiving the MBMS service data of the first cell after the cell change;
wherein the first cell is a cell before the cell change, and the second cell is a cell after the cell change,
wherein the method further comprises:
the terminal device receiving a first MBMS service data and a second MBMS service data of the first cell, wherein the second MBMS service data is same as the first MBMS service data, and a transmission start time of the second MBMS service data is later than a transmission start time of the first MBMS service data; and the terminal device receiving and processing the first MBMS service data, and when the terminal device detects that the first MBMS service data fails to be received, the terminal device receives and processes the second MBMS service data.

2. The method according to claim 1, wherein the method further comprises:

the terminal device acquiring an MBMS configuration information of the second cell before the cell change, wherein the MBMS configuration information of the second cell is used by the terminal device to receive the MBMS service data of the second cell.

3. The method according to claim 2, wherein the terminal device acquiring the MBMS configuration information of the second cell before the cell change comprises:

the terminal device acquiring the MBMS configuration information of the second cell from the first cell before the cell change; or the terminal device acquiring the MBMS configuration information of the second cell from a neighboring cell of the first cell before the cell change.

4. The method according to claim 1, wherein the MBMS service data of the first cell and the MBMS service data of the second cell have a same temporary mobile group identity (TMGI) and/or session identifier.

5. The method according to claim 1, wherein the cell change refers to a cell reselection or a cell handover.

6. A service data transmission method, comprising:

a terminal device receiving a first MBMS service data and a second MBMS service data of a first cell, wherein the second MBMS service data is same as the first MBMS service data, and a transmission start time of the second MBMS service data is later than a transmission start time of the first MBMS service data, wherein the method further comprises:

the terminal device receiving and processing the first MBMS service data, and when the terminal device detects that the first MBMS service data fails to be received, the terminal device receives and processes the second MBMS service data.

7. The method according to claim 6, wherein the terminal device detecting that the first MBMS service data fails to be received comprises:

detecting that there is a packet loss in the first MBMS service data; or failing to decode the first MBMS service data.

8. The method according to claim 6, wherein the first MBMS service data is a primary service data of the first cell, and the second MBMS service data is a secondary service data of the first cell.

9. The method according to claim 6, wherein the method further comprises:

the terminal device changing from the first cell to the second cell and receiving a third MBMS service data and a fourth MBMS service data of the second cell, wherein the fourth MBMS service data is same as the third MBMS service data, and a transmission start time of the fourth MBMS service data is later than a transmission start time of the third MBMS service data.

10. The method according to claim 9, wherein the method further comprises:

the terminal device receiving and processing the fourth MBMS service data during a process of changing from the first cell to the second cell;

the terminal device receiving and processing the third MBMS service data after changing from the first cell to the second cell.

11. The method according to claim 9, wherein the third MBMS service data is a primary service data of the second cell, and the fourth MBMS service data is a secondary service data of the second cell.

12. The method according to claim 9, wherein a cell change refers to a cell reselection or a cell handover.

13. A service data transmission apparatus, comprising:

a receiver configured to receive a multimedia broadcast multicast service (MBMS) service data of a first cell and an MBMS service data of a second cell before a cell change; and the receiver configured to stop receiving the MBMS service data of the first cell after the cell change;

wherein the first cell is a cell before the cell change, and the second cell is a cell after the cell change, wherein the receiver is configured to receive a first MBMS service data and a second MBMS service data of the first cell, wherein the second MBMS service data is same as the first MBMS service data, and a transmission start time of the second MBMS service data is later than a transmission start time of the first MBMS service data, wherein the apparatus further comprises:

a processor configured to receive and process the first MBMS service data, wherein when the processor detects that the first MBMS service data fails to be received, the processor receives and processes the second MBMS service data.

14. The apparatus according to claim 13, wherein the apparatus further comprises:

an acquiring unit configured to acquire an MBMS configuration information of the second cell before the cell change, wherein the MBMS configuration information of the second cell is used by the terminal device to receive the MBMS service data of the second cell.

15. The apparatus according to claim 14, wherein the acquiring unit is configured to acquire the MBMS configuration information of the second cell from the first cell before the cell change; or the acquiring unit is configured to acquire the MBMS configuration information of the second cell from a neighboring cell of the first cell before the cell change.

16. The apparatus according to claim 13, wherein the MBMS service data of the first cell and the MBMS service data of the second cell have a same temporary mobile group identity (TMGI) and/or session identifier.

17. The apparatus according to claim 13, wherein the cell change refers to a cell reselection or a cell handover.

* * * * *